US007295697B1

(12) United States Patent
Satoh (10) Patent No.: US 7,295,697 B1
(45) Date of Patent: Nov. 13, 2007

(54) DEPTH INFORMATION MEASUREMENT APPARATUS AND MIXED REALITY PRESENTATION SYSTEM

(75) Inventor: Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1497 days.

(21) Appl. No.: 09/648,295

(22) Filed: Aug. 28, 2000

(30) Foreign Application Priority Data

Dec. 6, 1999 (JP) ................................. 11-346699

(51) Int. Cl.
*G06K 9/00* (2006.01)
(52) U.S. Cl. ..................................................... 382/154
(58) Field of Classification Search ................ 382/100, 382/106, 108, 154; 359/263, 318; 345/582–588; 356/3, 3.01, 3.09
See application file for complete search history.

(56) References Cited

U.S. PATENT DOCUMENTS

| 6,268,923 | B1 * | 7/2001 | Michniewicz et al. ...... 356/512 |
| 6,269,197 | B1 * | 7/2001 | Wallack ...................... 382/285 |
| 6,847,392 | B1 * | 1/2005 | House ......................... 348/36 |
| 7,013,040 | B2 * | 3/2006 | Shiratani .................... 382/154 |

OTHER PUBLICATIONS

"Occlusion Detectable Stereo Using a Camera Matrix", K. Satoh, et al., Proc. 2nd Asian Conference on Computer Vision, pp. II-331-335, 1995.
"Occlusion Detectable Stereo-Systematic Comparison of Detection Algorithms", K. Satoh, et al., Pro. International Conference on Pattern Recognition, pp. 280-286, 1996.
"Stereo by Intra-and Inter-Scanline Search Using Dynamic Programming", Y. Ohta, et al., IEE Transaction on Pattern Analysis and Machine Intelligence, vol. PAMI-7, No. 2, Mar. 1985.
"CMU Video-Rate Stereo Machine", S. Kimura, et al., Mobile Mapping Symposium, Columbus, Ohio, May 24-26, 1995.
"Development of a Video-Rate Stereo Machine", T. Kanade, et al., Proceedings of International Robotics and Systems Conference (IROS) Pittsburgh, Pennsylvania, Aug. 7-9, 1995.

* cited by examiner

*Primary Examiner*—Vikkram Bali
(74) *Attorney, Agent, or Firm*—Fitzpatrick, Cella, Harper & Scinto (57) ABSTRACT

There is disclosed a depth information generation apparatus capable of acquiring high-precision depth information within a short computation time. A depth information generation apparatus of this invention generates depth information at the capture position of a reference image from the reference image, and at least one peripheral image that forms a stereo image pair with the reference image, and has a high-speed stereo processor (30) for generating depth information at high speed from the reference image and peripheral image, and a high-precision stereo processor (40) for generating high-precision depth information. A motion detector (20) detects a motion in an image, and instructs an image composition unit (50) to select the output from the high-speed stereo processor (30) for a portion with a large motion, and the output from the high-precision stereo processor (40) for other portions. The image composition unit (50) composites the outputs from the high-speed stereo processor (30) and high-precision stereo processor (40) in accordance with an instruction from the motion detector (20), and outputs a depth map as final depth information.

30 Claims, 8 Drawing Sheets

DEPTH INFORMATION MEASUREMENT APPARATUS AND MIXED REALITY PRESENTATION SYSTEM

FIELD OF THE INVENTION

The present invention relates to a depth information measurement apparatus for acquiring, from a real space image captured from a certain position, distance information (depth information) from the image capture position to an object included in that image and, more particularly, to a depth information measurement apparatus which is excellent in both measurement processing speed and processing precision.

BACKGROUND OF THE INVENTION

In recent years, studies of Mixed Reality (MR) for the purpose of seamless merging of a real space and virtual space have been extensively made. Conventionally, MR has received a lot of attention as a technique that aims at achieving coexistence of the real space and a virtual reality (VR) world that can be experienced in only a situation isolated from the real space, and augments VR.

A typical apparatus for implementing MR is a head-mounted display (HMD). That is, MR is implemented by displaying a composite image of the real space (or its video image) and virtual space image on the HMD. MR systems using the HMD includes an optical see-through system in which the user experiences an MR space by displaying a virtual space image generated by, e.g., computer graphics (CG) on a semi-transparent (see-through) head-mounted display (HMD) to composite by the user's eyes a real space that the user directly observes by his or her eyes and the virtual space image on the display, and a video see-through system in which the user experiences an MR space by generating an MR space image as a composite image of image data sensed by a video camera attached to, e.g., an HMD and a CG image or the like, and displaying the composite image on the HMD.

MR can be used, quite possibly, in new fields which are qualitatively quite different from VR, such as a medical assist application for presenting the state inside the body of a patient to a doctor as if it were seen through, a job assist application for superposing and displaying the assembly sequence of a product on real parts in a factory, a game application such as a shooting game, sports simulation, or the like that displays virtual enemies, ball, or the like generated by a virtual space image in a real space, a living simulation that allows the user to lay out virtual furniture in a physical space room, and the like.

In order to implement such MR space, the positional relationship of objects in the real space must be recognized. That is, when an object (virtual object) represented by a virtual space image is displayed, a portion occluded by an object present in the real space must be inhibited from being displayed. When a virtual object is moved, it must be inhibited from being moved to a position that overlaps an object in the real space. Also, when hitting determination between an object in the real space and virtual object is made in, e.g., a game, the position information of a real object is required.

Methods of acquiring object position information in the real space include a method using a laser rangefinder which scans a laser beam and obtains distance information (depth information) on the basis of the time until the returned laser beam is received, a multiview stereo algorithm that senses the real space using a plurality of video cameras, and obtains the distance from the image sensing position to an object on the basis of the sensed image data, and the like. On the other hand, the depth information is often used in the form of a depth map which is imaged by changing the luminance levels, assigning different colors, or the like in correspondence with different distances.

An MR presentation system must mix the real space and virtual space images at the user's viewpoint position without any disturbance, and present (display) the mixed image. Since the user's viewpoint position always moves, detection of depth information and viewpoint position information, and rendering based on such information must be done at a speed close to real time. Especially, in an application such as a game, since the user's viewpoint position moves quickly and largely, acquisition of depth information (generation of a depth map) requires high-speed processing.

However, in a conventional depth information measurement apparatus, if computations are made at high speed, the obtained depth information has low precision; if high-precision information is to be obtained, computations become complicated, and a long processing time is required.

The present invention has been made in consideration of the aforementioned conventional problems, and has as its object to provide a depth information measurement apparatus which can acquire high-precision depth information in a short computation time.

SUMMARY OF THE INVENTION

More specifically, the gist of the present invention lies in a depth information measurement apparatus for measuring depth information at a capture position of a reference image on the basis of the reference image, and at least one peripheral image that forms a stereo image pair with the reference image, comprising: a plurality of depth information measurement means for measuring depth information from the reference image and peripheral image, the plurality of depth information measurement means using different measurement methods; selection means for selecting one of a plurality of pieces of depth information for each predetermined region of the reference image; and composition means for compositing the depth information selected by the selection means and outputting the composited information as depth information at the capture position of the reference image.

In the depth information measurement apparatus of the present invention, preferably, the plurality of depth information measurement means include depth information measurement means for measuring a plurality of pieces of depth information having different precision levels.

In the depth information measurement apparatus of the present invention, preferably, the selection means selects in accordance with a predetermined condition, and more preferably, the predetermined condition is a condition obtained from the reference image and/or the peripheral image.

In the depth information measurement apparatus of the present invention, preferably, the selection means comprises motion detection means for detecting a motion in each predetermined region from the reference image, and the selection means selects one of the plurality of pieces of depth information in accordance with an amount and/or a direction of the detected motion.

In the depth information measurement apparatus of the present invention, preferably, one of the plurality of depth information measurement means comprises reliability detection means for detecting a reliability of the measured depth information, and the selection means selects one of the plurality of pieces of depth information in accordance with the detected reliability.

In the depth information measurement apparatus of the present invention, preferably, the plurality of depth information measurement means use different conditions upon measuring depth information, and more preferably, the conditions include occlusion by an object.

In the depth information measurement apparatus of the present invention, preferably, the plurality of depth information and depth information output from the composition means are one of disparity information, a disparity map, distance information, and a range image.

The depth information measurement apparatus of the present invention preferably further comprises means for generating the reference image and the at least one peripheral image.

Another gist of the present invention lies in a depth information measurement apparatus for measuring depth information at a capture position of a reference image on the basis of the reference image, and at least one peripheral image that forms a stereo image pair with the reference image, comprising: first depth information measurement means for measuring first depth information from the reference image and the peripheral image; second depth information measurement means for measuring second depth information from the reference image and the peripheral image by a method different from the first depth information measurement means; selection means for selecting one of the first depth information and the second depth information for each predetermined region of the reference image or the peripheral image; and composition means for compositing the first depth information and the second depth information in accordance with a selection signal, and outputting the composited information as depth information as the capture position of the reference image.

Still another gist of the present invention lies in a mixed reality presentation system including a depth information measurement apparatus of the present invention.

Still another gist of the present invention lies in a storage medium which stores a program that can be executed by a computer apparatus, and makes the computer apparatus that has executed the program function as a depth information measurement apparatus of the present invention.

Still another gist of the present invention lies in a depth information measurement method for measuring depth information at a capture position of a reference image on the basis of the reference image, and at least one peripheral image that forms a stereo image pair with the reference image, comprising steps of: a measurement step of measurement a plurality of depth information from the reference image and peripheral image, using different measurement methods; a selection step of selecting one of the plurality of depth information for each predetermined region of the reference image; and a composition step of compositing the depth information selected by said selection step and outputting the composited information as depth information at the capture position of the reference image.

Still another gist of the present invention lies in an image generation apparatus comprising: a first image processor for generating a stereo image from a plurality of images having disparity; a second image processor capable of generating an image with a higher precision than that of said first image processor; a motion detector for detecting a motion of an image; and an image generator for generating an image by selectively using outputs from said first and second image processors on the basis of an output from said motion detector.

Still another gist of the present invention lies in an image generating method comprising steps of: a first image processing step of generating a stereo image from a plurality of images having disparity; a second image processing step of generating an image with a higher precision than that of said first image processing step; a motion detecting step of detecting a motion of an image; and an image generating step of generating an image by selectively using outputs from said first and second image processors on the basis of an output from said motion detecting step.

Still another gist of the present invention lies in a computer-readable storage medium which stores a program for generating an image, said program comprising: a first image processing step of generating a stereo image from a plurality of images having disparity; a second image processing step of generating an image with a higher precision than that of said first image processing step; a motion detecting step of detecting a motion of an image; and an image generating step of generating an image by selectively using outputs from said first and second image processors on the basis of an output from said motion detecting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
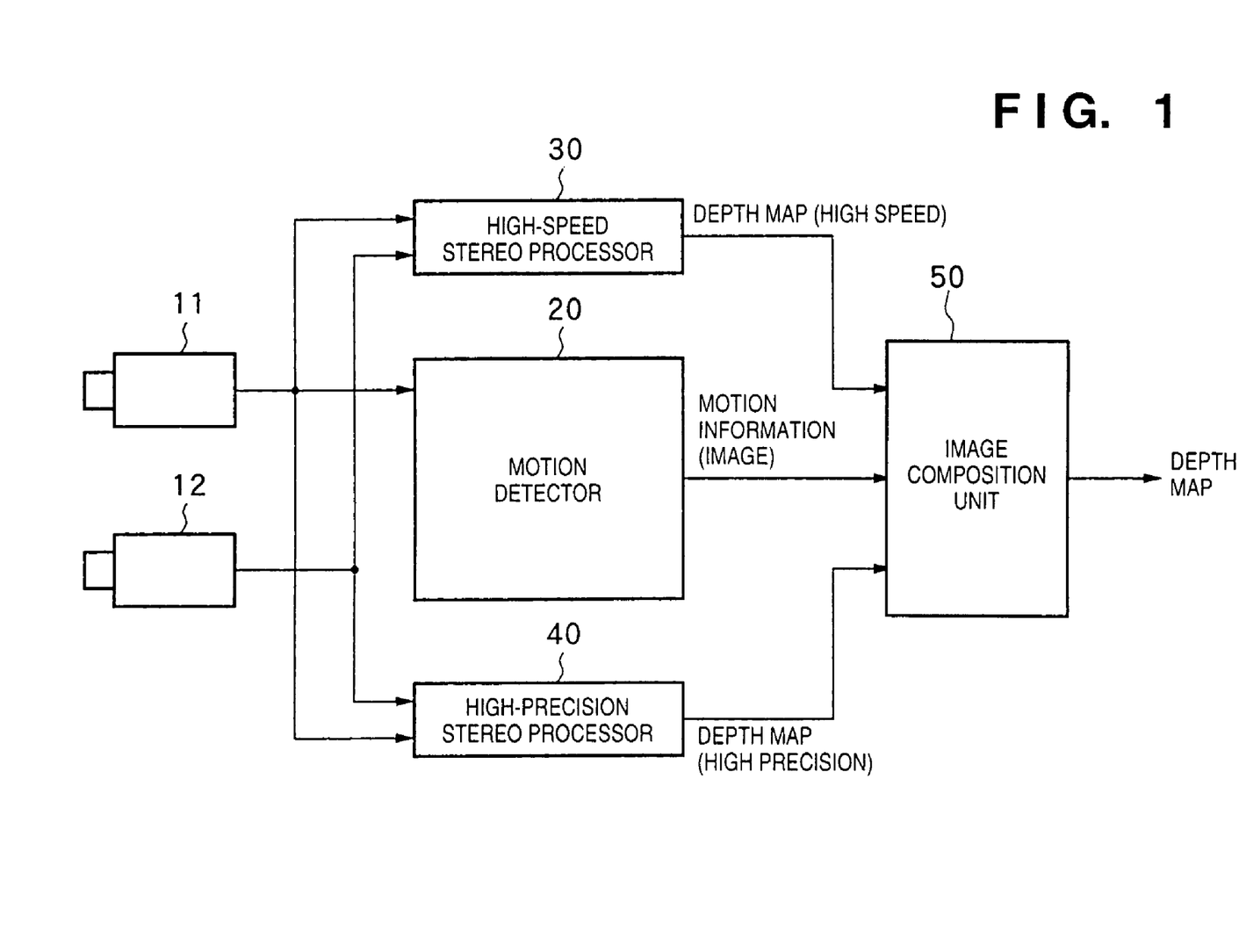
FIG. 1 is a block diagram showing an example of the arrangement of a depth information measurement apparatus according to the first embodiment of the present invention.

FIG. 1 is a block diagram showing an example of the arrangement of a depth information measurement apparatus according to an embodiment of the present invention. In this embodiment, depth information is a depth map, and the arrangement using a multiview stereo algorithm will be exemplified.

Referring to FIG. 1, a depth information measurement apparatus comprises a stereo camera including a reference camera 11 and peripheral camera 12, a motion detector 20, a high-speed stereo processor 30, a high-precision stereo processor 40, and an image composition unit 50. A reference image sensed by the reference camera 11 is input to the motion detector, high-speed stereo processor 30, and high-precision stereo processor 40. On the other hand, a peripheral image sensed by the peripheral camera 12 is input to the high-speed stereo processor 30 and high-precision stereo processor 40. Note that the stereo camera illustrated in FIG. 1 is constituted by two cameras for the sake of simplicity. However, in order to improve the processing precision in the high-speed stereo processor 30 and high-precision stereo processor 40 to be described later, three or more cameras are preferably used in practice. Especially, a so-called camera matrix in which a plurality of peripheral cameras are regularly laid out on a square region having one reference camera as a center camera like five cameras, nine cameras, 13 cameras, . . . is preferably used. As for the third and subsequent cameras, their images can be input to the high-speed stereo processor 30 and high-precision stereo processor 40.

The high-speed stereo processor 30 and high-precision stereo processor 40 independently have a function of measuring depth information from image data sensed by the stereo camera, and generating a depth map. The high-speed stereo processor 30 generates a depth map at high speed, although its precision is lower than that of the high-precision stereo processor 40. Conversely, the high-precision stereo processor 40 can generate a depth map having higher precision than the high-speed stereo processor 30, but requires a longer time for generation.

In order to implement high-speed processing closer to the aforementioned real-time processing, at least the high-speed stereo processor 30 is preferably capable of outputting a depth map within a time equal to or shorter than a one-frame processing time at the video frame rate (30 frames/sec or 60 frames/sec). That is, the high-speed stereo processor 30 preferably has a capability of completing a process for generating a depth map by processing image data for one frame within 33 msec or 17 msec. Such high-speed stereo processor 30 can be constituted on the basis of disclosures of references such as Takeo Kanade and Shigeru Kimura, "Video-rate Stereo Machine", exponent of the Journal of the Robotics Society of Japan, vol. 13, No. 3, pp. 322-326, 1995, K. Satoh and Y. Ohta, "Occlusion detectable stereo using a camera matrix", Proc. 2nd Asian Conf. on Computer Vision, pp. II-331-335, 1995, which discloses an example of a high-speed stereo process to be described later, and the like.

An example of processes in such high-speed stereo processor 40 flows: (1) dissimilarity (or similarity) computations of corresponding candidate points; (2) disparity estimation based on the similarity; and (3) visualization of the estimated disparity.

Figure 2:
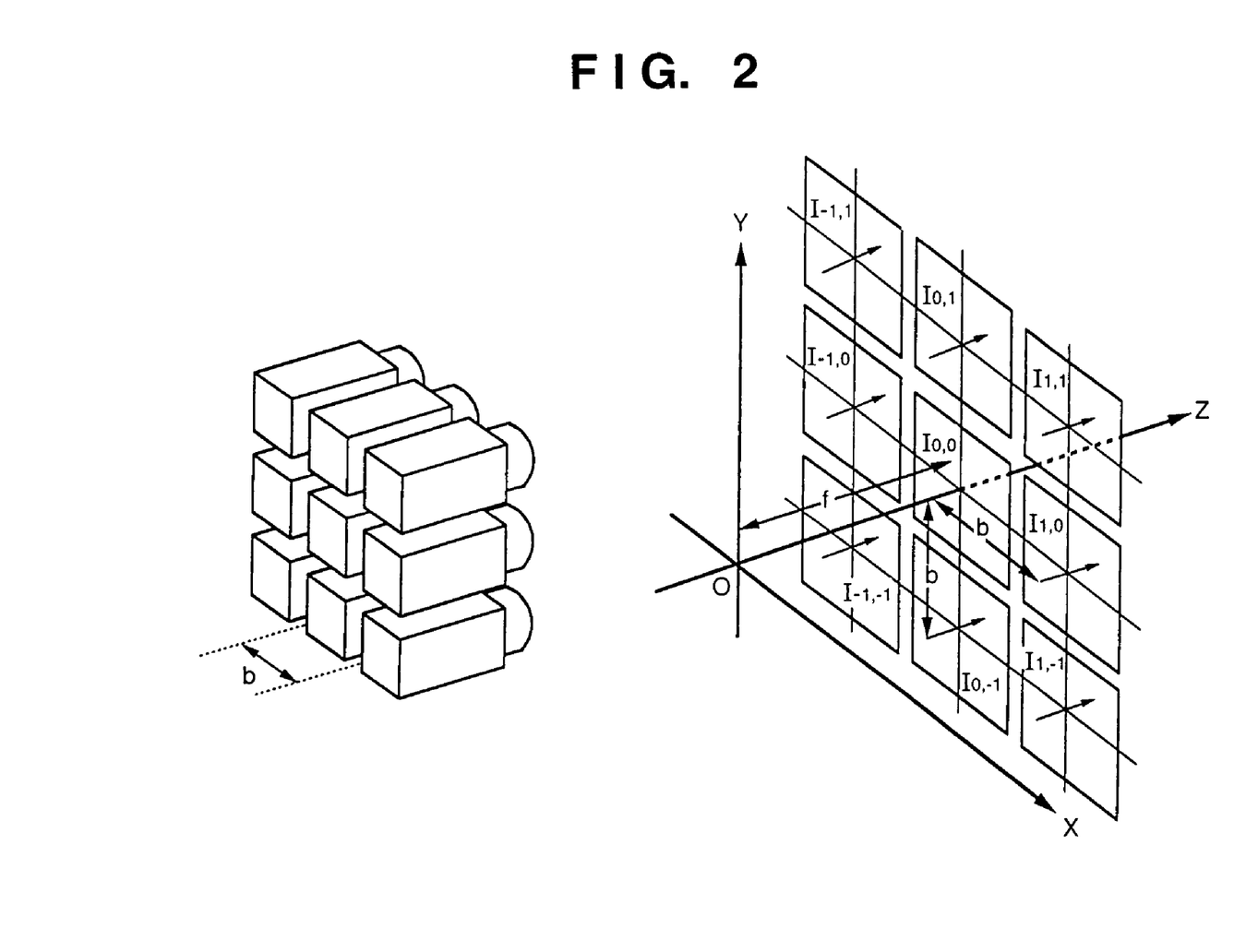
FIG. 2 is a perspective view showing an example of the arrangement of a stereo camera.

For example, as shown in FIG. 2, from N−1 stereo image pairs formed by central image (reference image) $I^{0,0}$ and N−1 peripheral images $I^{k,l}$ (−1≦K, l≦1 in FIG. 2), which are sensed by a camera matrix including N (N=9 in FIG. 2) cameras, which are arranged at equal intervals so that their optical axes are parallel to each other, and a plane that passes all the lens centers is perpendicular to the optical axes, the disparity at pixel $I^{0,0}(x, y)$ on central image $I^{0,0}$ can be estimated in the following sequence.

(1) Compute Dissimilarity

Initially, dissimilarity $e^{k,l}(x, y, d)$ between pixel $I^{0,0}(x, y)$ and corresponding point $I^{k,l}(x-kd, y-ld)$ on each peripheral image when the disparity is assumed to be d is computed. The dissimilarity is computed using the Euclidean distance between two pixels (or small blocks having each pixel as the center) in the RGB space.

(2) Compute Estimated Disparity

The sum total of dissimilarities $e^{k,l}(x, y, d)$ obtained by the respective stereo image pairs:

$$e(x, y, d) = \sum_{k,l} e^{k,l}(x, y, d) \tag{1}$$

is defined as the penalty value of the disparity d, and d that minimizes the penalty value is selected as an estimated disparity d' at $I^{0,0}(x, y)$.

(3) Visualize Estimated Disparity

By assigning the values of the estimated disparities d' obtained for the respective pixels as pixel values of corresponding pixels, a disparity map, i.e., a depth map, is generated.

On the other hand, the high-precision stereo processor 40 must assure higher precision of the obtained depth map than the high-speed stereo processor 30, although its processing speed is lower. More specifically, the high-precision stereo processor 40 can generate a depth map with higher precision than that of a depth map generated by the high-speed stereo processor 30, since it generates an image in consideration of a condition, which is not taken into consideration in the high-speed stereo processor 30, e.g., the influences of occlusion.

The simplest occlusion detection method is to search for a portion which is present in one of a stereo image pair but is not present in the other. By increasing the number of cameras that capture stereo images, the occlusion detection precision can be improved. A method of generating a depth map in consideration of the influences of occlusion in such multiview stereo algorithm is disclosed in, for example, the aforementioned reference, K. Satoh and Y. Ohta, "Occlusion detectable stereo using a camera matrix", Proc. 2nd Asian Conf. on Computer Vision, pp. II-331-335, 1995, and the like.

More specifically, the estimated disparity is computed by correcting the influences of occlusion in the high-speed stereo algorithm on the basis of the following principle.

Occlusion is a phenomenon in which a point that can be observed on the central image sensed by a camera located at the center of the camera matrix is occluded by an object located in front of that point, and cannot be observed in one or more images (peripheral images) sensed by other cameras.

With respect to the actual disparity d between corresponding pixels in a stereo image pair, in a portion that has an occlusion event, the corresponding point $I^{k,l}(x-kd, y-ld)$ in the aforementioned stereo process is an image of an occluder, and the dissimilarity $e^{k,l}(x, y, d)$ does not become small. As a result, the penalty value $e(x, y, d)$ of the disparity d, which is given by equation (1), becomes large, and a value different from the actual disparity d is highly likely to be selected as a value that minimizes the penalty value.

In order to avoid a different value from being selected, equation (1) should be computed without using a peripheral image that is occluded. However, when the dissimilarity is large, it is hard to determine if such large dissimilarity means incorrect disparity d or is caused by occlusion.

When another object is present on a line that connects the lens center of a camera which senses a peripheral image, and a target point in a space to be sensed, the peripheral image sensed by this camera contains an occlusion event. Therefore, a combination of peripheral images containing occlusion events can be considered as the boundary of an occluder, which is sampled by the lattice points of the camera matrix.

Assuming that the boundary of the occluder is locally linear, combinations of peripheral images containing occlusion events are limited to eight patterns, and a false disparity and a true disparity that has suffered occlusion can be distinguished from each other as follows.

Figure 3:
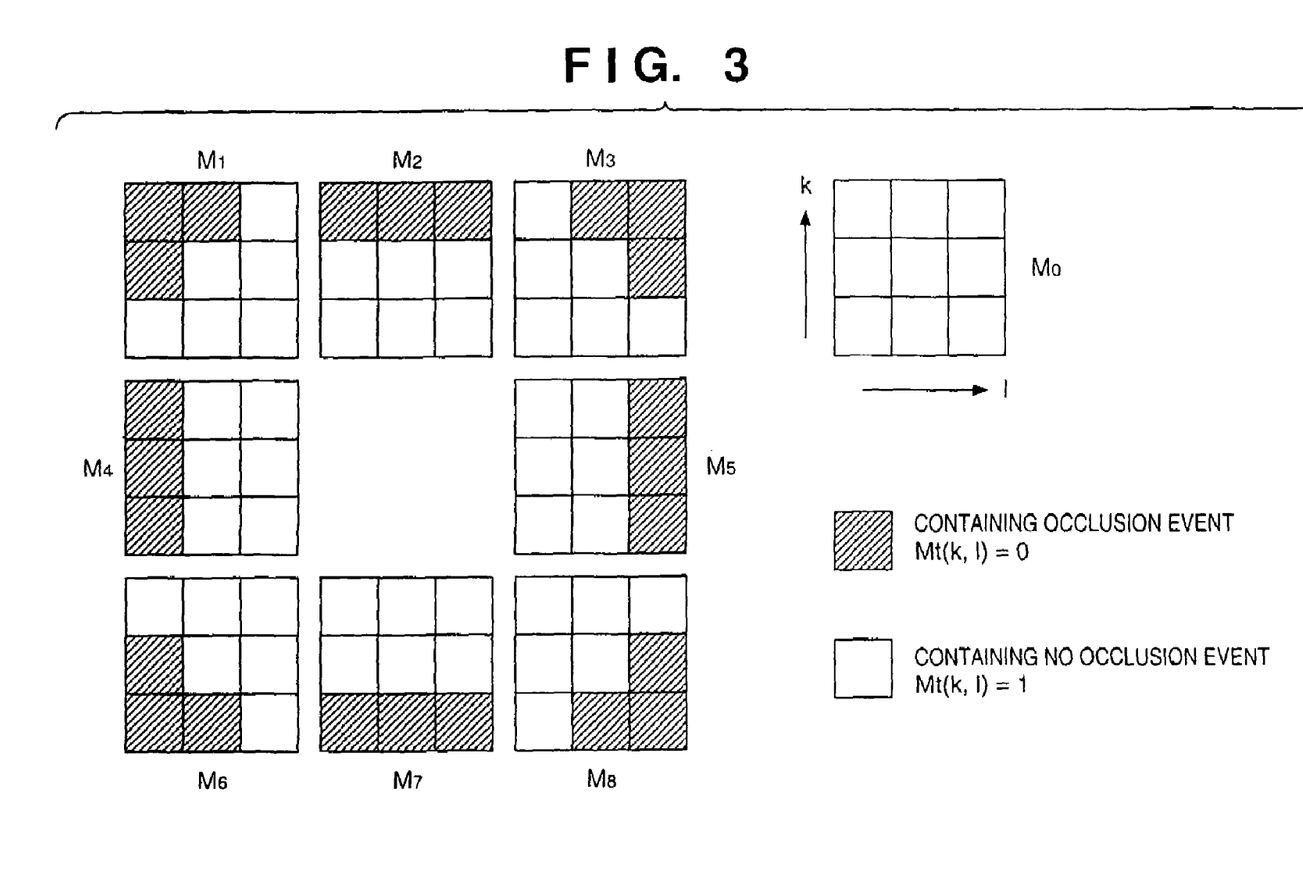
FIG. 3 shows an example of an occlusion mask.

Masks (occlusion masks) M0 to M8 of types 0 to 8 that express combinations of peripheral images containing occlusion events are prepared, as shown in FIG. 3. A black portion indicates a peripheral image containing an occlusion event, and its value is represented by "0"; a white portion indicates an occlusion-free image, and its value is represented by "1". M0 indicates an occlusion-free case on all images.

As described above, if a peripheral image containing an occlusion event is not used, a penalty for the disparity d under the assumption that a state expressed by an occlusion mask Mt has occurred is re-defined as:

$$e_t(x, y, d) = \frac{w_t}{n_t} \sum_{M_t(k,l)=1} e^{k,l}(x, y, d) \qquad (2)$$

where $n_t$ is the number of 1s in the peripheral images in each mask Mt. On the other hand, $w_t$ is a weight that makes t=0 easy to select if no occlusion event is contained, and is set at w0=1 when t=0 or at a value slightly larger than 1 in other cases. At this time, $e_t(x, y, d)$ is minimized when the actual disparity d is assumed, and is evaluated using an occlusion mask corresponding to the combination of peripheral images actually containing occlusion events.

Evaluation formula (I) of penalty e described in the high-speed stereo process is re-defined as:

$$e(x, y, d) = \min_t e_t(x, y, d) \qquad (3)$$

and the disparity d that minimizes this penalty is selected as the estimated disparity d' at $I^{0,0}(x, y)$ that considers occlusion. By visualizing this estimated disparity d', a depth map (disparity map) that considers occlusion is generated.

The time which is allowed for the high-precision stereo processor 40 to generate one depth map is appropriately determined in accordance with conditions such as an application of the depth map, the depth map precision obtained by the high-speed stereo processor 30, the processing time, and the like. Conversely, a process capable of generating a depth map with best precision within the range that satisfies these conditions may be determined to be executed by the high-precision stereo processor 40.

The depth information measurement apparatus of this embodiment is characterized in that depth map data generated by the high-speed stereo processor 30 or those generated by the high-precision stereo processor 40 are selectively composited in correspondence with the characteristics of image data to generate a depth map for one frame.

In this embodiment, the motion detector 20 detects a motion of a reference image captured by the reference camera 11, and the image composition unit 50 selects and composites depth map data output from the high-speed stereo processor 30 for a portion with motion, and those output from the high-precision stereo processor 40 for a portion without any motion on the basis of the detection result of the motion detector 20, thus generating a depth map for one frame.

More specifically, depth map data generated by the high-precision stereo processor 40 is selected for a portion such as a still object in a real space, which has a period of a change in distance information sufficiently longer than the time (unit processing time) required for the high-precision stereo processor 40 to generate a depth map for one frame, and depth map data generated by the high-speed stereo processor 30 is selected for a portion such as an object in motion, which has a period of a change in distance information shorter than the unit processing time of the high-precision stereo processor 40, thus obtaining a depth map that can achieve both high precision and high processing speed with good balance.

In this case, depth map data generated by the high-precision stereo processor 40 is commonly used for a plurality of frames of depth map data generated by the high-speed stereo processor 30. However, since the depth map generated by the high-precision stereo processor 40 is used in a portion such as a still portion where the change in distance information has a sufficiently long period, a practical problem is unlikely to be posed.

The motion detector 20 can be implemented using a circuit (e.g., an MPEG encoder or the like) that compresses and encodes a moving image. As motion information output from the motion detector 20, at least a region corresponding to a motion need only be recognized, and information such as the amount, direction, and the like of motion may be included.

Also, the inter-frame difference of an input image may be computed to detect a region having a large change in pixel value as a region with motion, or other motion detection schemes may be used.

The image composition unit 50 is a selector for selecting in units of data, i.e., in units of pixels of image data, one of the outputs from the high-speed stereo processor 30 and high-speed stereo processor 40 on the basis of the motion information from the motion detector 20. In this case, selection may be simply made based on whether or not a motion is detected, or may be made to select the output from the high-precision stereo processor 40 if the detected motion has a predetermined moving amount or less, or the output from the high-speed stereo processor 30 if the detected motion exceeds the predetermined moving amount.

Figure 4:
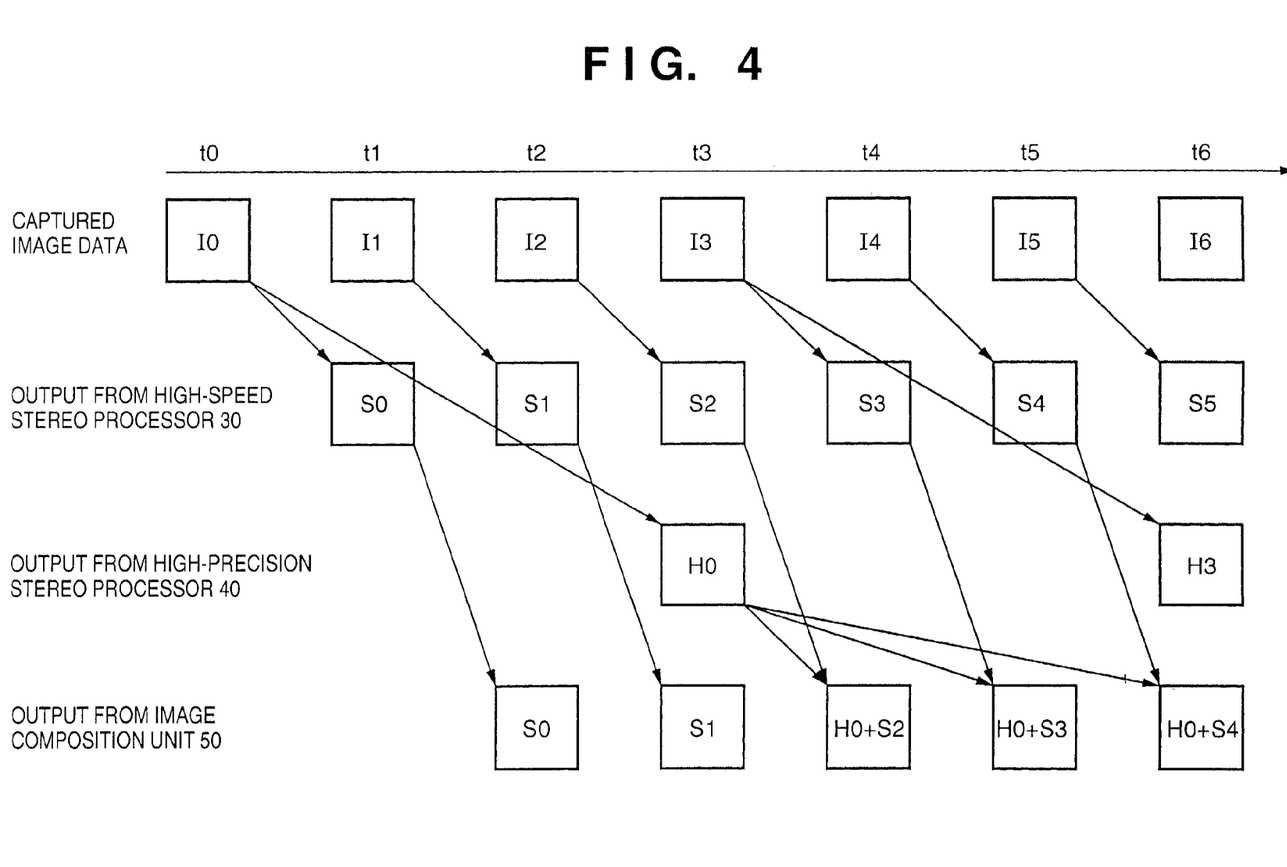
FIG. 4 is a chart showing the output timings of respective units in the arrangement shown in FIG. 1.

FIG. 4 shows the output timings of the respective units at the beginning of operation. Assume that t represents the reciprocal number of the frame rate of the stereo camera (i.e., an image capture time for one frame), and t0 to t6 are intervals of t. For the sake of simplicity, assume that the time required for the high-speed stereo processor 30 to execute a process for one frame is t, the high-precision stereo processor 30 requires processing time 3t, and the image composition unit 50 requires time t for compositing and outputting the outputs from the high-speed stereo processor 30 and high-precision stereo processor 40. Although not shown, the motion detector 20 can detect motion information within a time sufficiently shorter than t, and can supply it to the image composition unit 50.

At time t0, the stereo camera captures an image I0. This image I0 is input to the high-speed stereo processor 30 and high-precision stereo processor 40 to start the processing.

At time t1 time t later, the processing of the high-speed stereo processor 30 is completed and a depth map S0 corresponding to the image data I0 is output to the image composition unit 50. At this time, since the processing of the high-precision stereo processor 40 is not complete yet, the image composition unit 50 directly outputs the output S0 from the high-speed stereo processor 30, and completes the output process at time t2.

At time t2, an output S1 of the high-speed stereo processor 30 corresponding to image data I1 captured at time t1 is supplied to the image composition unit 50. At time t2 as well, since the processing of the high-precision stereo processor 40 is not complete yet, the image composition unit 50 directly outputs the output S1 from the high-speed stereo processor 30 again.

At time t3, the processing of the high-precision stereo processor 40 is complete, and a high-precision depth map H0 corresponding to the captured image data I0 is output. On the other hand, at time t3 the high-speed stereo processor 30 outputs a depth map S2 corresponding to image data I2 captured at time t2.

At time t4, the image composition unit 50 generates a depth map by selecting the depth map H0 output from the high-precision stereo processor 40 for a portion corresponding to a motion smaller than a predetermined value, and the depth map S2 output from the high-speed stereo processor 30 for other portions, on the basis of motion information which has been detected by the motion detector 20 for the image data I0 (captured image data as a source of the depth map H0) and I2 (captured image data as a source of the depth map S2), and outputs the generated map.

At times t4 to t6, the image composition unit 50 outputs final depth maps using the output H0 from the high-precision stereo processor 40 and the outputs S2 to S4 from the high-speed stereo processor 30. Since a depth map H3 as the next output of the high-precision stereo processor 40 is obtained at time t6, final depth maps H3+S5, H3+S6, and H3+S7 are obtained using this depth map H3 and depth maps S5 to S7 output from the high-speed stereo processor 30 at times t7 to t9 (not shown). After that, similar processes are repeated.

In this embodiment, the motion information may be supplied to the high-speed stereo processor 30, and the process of the high-speed stereo processor 30 may be omitted for a region which has nearly no motion, and can use the output from the high-precision stereo processor 40. In such case, no large effect is expected unless the processing speed of the motion detector 20 is sufficiently higher than that of the high-speed stereo processor 30.

Second Embodiment

In the first embodiment, one of the outputs from the high-speed stereo processor 30 and high-precision stereo processor 40 is selected based on the motion information from the motion detector 20. Alternatively, a selection condition other than the motion information can be used. This embodiment is characterized in that the reliability of depth information is used as the condition for selecting one of the outputs from the high-speed stereo processor 30 and high-precision stereo processor 40.

Figure 5:
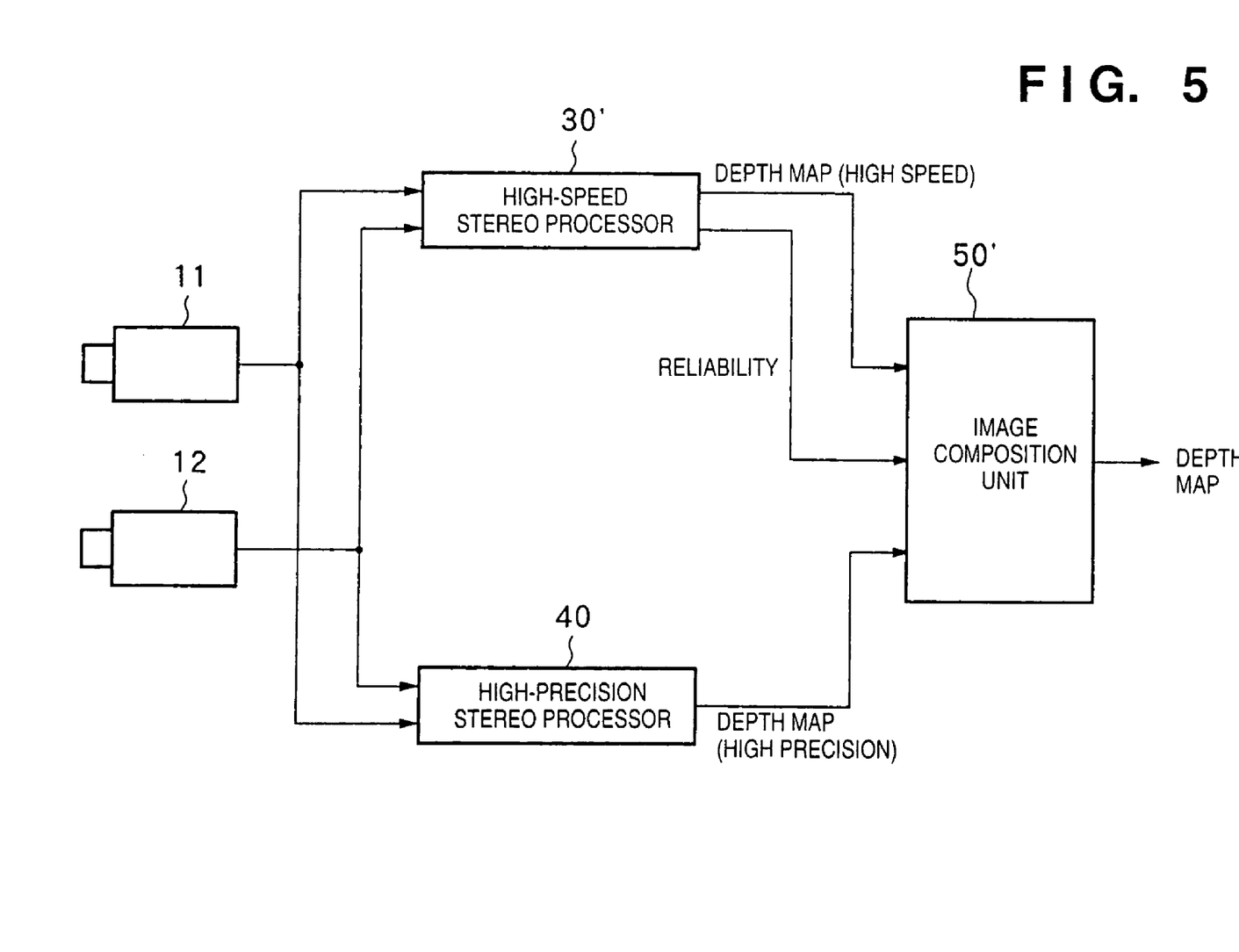
FIG. 5 is a block diagram showing an example of the arrangement of a depth information measurement apparatus according to the second embodiment of the present invention.

FIG. 5 shows an example of the arrangement of the depth information measurement apparatus according to this embodiment. The arrangement shown in FIG. 5 is substantially the same as that of the apparatus according to the first embodiment shown in FIG. 1, except that the motion detector 20 is omitted, and the reliability of depth information output from a high-speed stereo processor 30' is used in place of motion information. In this embodiment, the reliability of an estimated disparity $S(x, y)$ at $I^{0,0}(x, y)$ is defined by a penalty value $e(x, y, S(x, y))$ (or the difference of the penalty value from a constant) upon computing that disparity. The high-speed stereo processor 30' outputs a reliability map that saves the reliabilities of estimated disparities in units of pixels as pixel values in addition to a depth map S.

The high-speed stereo processor 30' computes the reliability of depth image data in units of pixels or predetermined regions, and an image composition unit 50' selects the output from the high-precision stereo processor 40 for a region with a low reliability, and that from the high-speed stereo processor 30' for a region with a high reliability.

Third Embodiment

Figure 6:
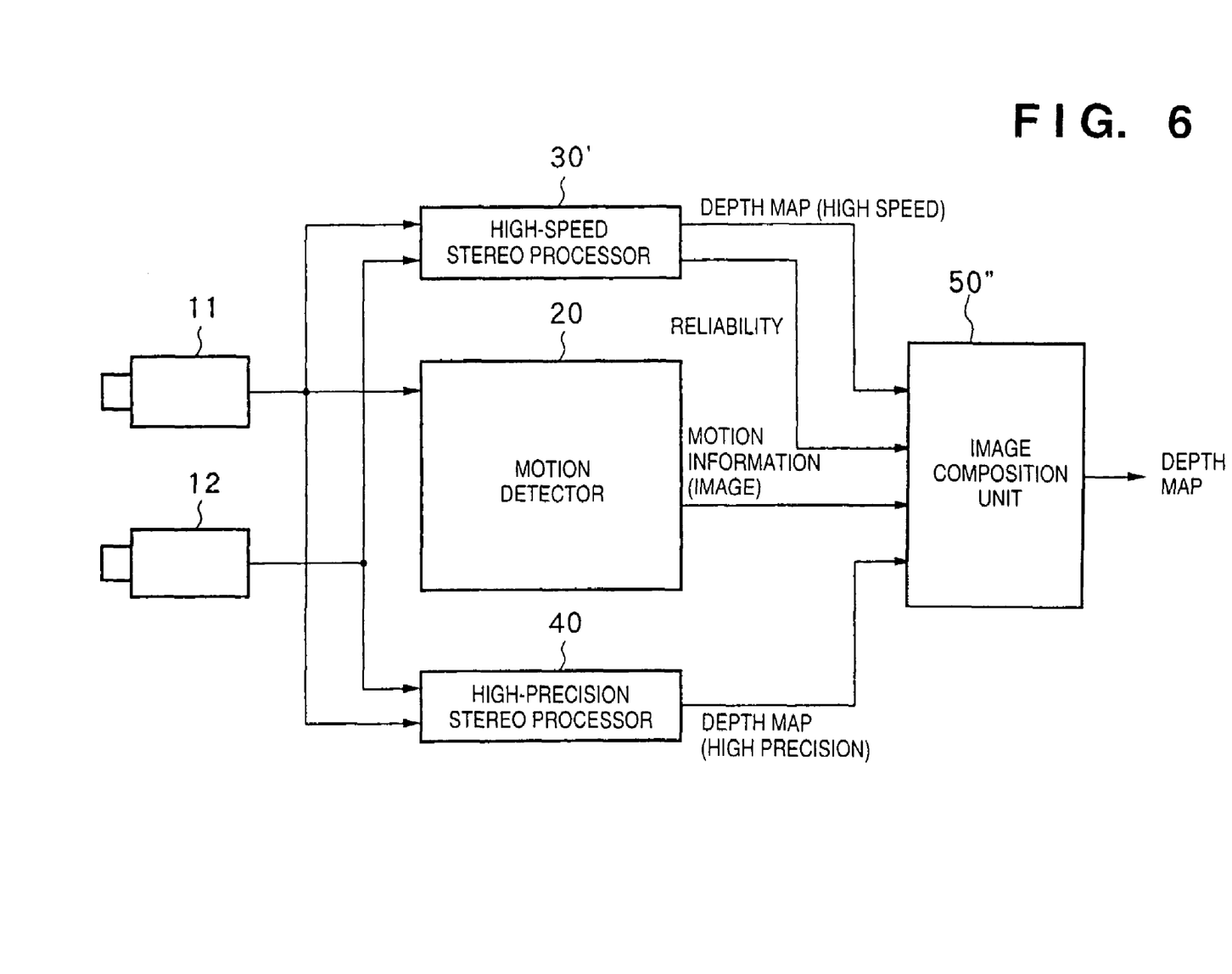
FIG. 6 is a block diagram showing an example of the arrangement of a depth information measurement apparatus according to the third embodiment of the present invention.

FIG. 6 is a block diagram showing the arrangement of a depth information measurement apparatus according to the third embodiment of the present invention. This embodiment is characterized in that both the motion information and reliability of depth information are used as a condition upon selecting one of the outputs from the high-speed stereo processor 30' and high-precision stereo processor 40.

As an example of the selection condition, an image composition unit 50" may select and output the output from the high-precision stereo processor 40 for a region in which the reliability is lower than a predetermined value or the motion is smaller than a predetermined amount, and the output from the high-speed stereo processor 30' for other regions.

Fourth Embodiment

Figure 7:
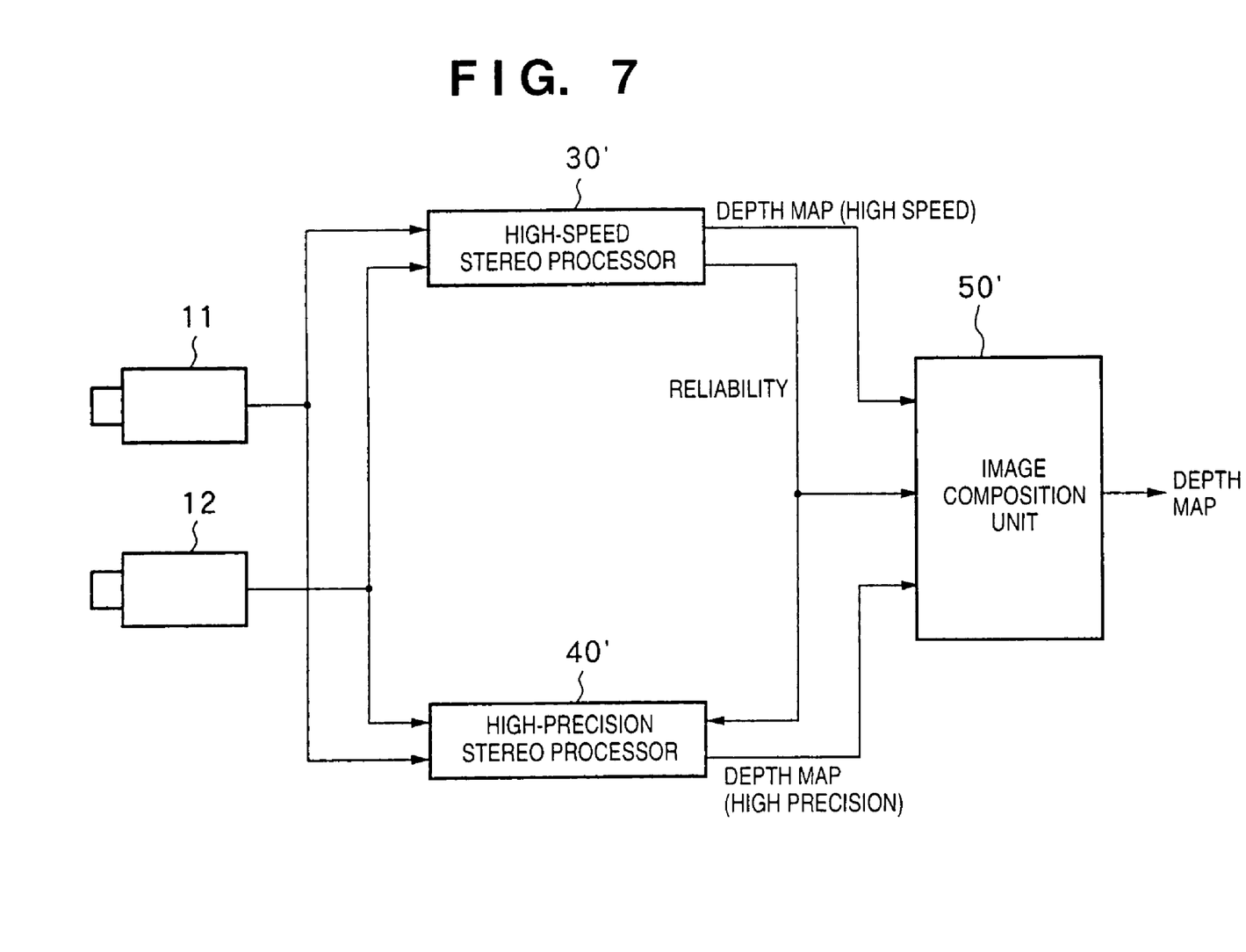
FIG. 7 is a block diagram showing an example of the arrangement of a depth information measurement apparatus according to the fourth embodiment of the present invention.

In the second embodiment, both the high-speed stereo processor 30 and high-precision stereo processor 40 execute a depth information measurement process for all the regions in an image. As shown in FIG. 7, when the reliability output from the high-speed stereo processor 30 is used as a trigger of depth information composition, the reliability information is independently input to the high-precision stereo processor 40', so that the image composition unit 50' executes a depth information measurement process only for a region where the image composition unit 50' selects the depth information output from the high-precision stereo processor 40'. In this manner, the processing volume of the high-precision stereo processor 40' can be reduced. Likewise, in general, when information, which is input to the image composition unit 50 as a measure for selecting depth information, is input to the high-speed stereo processor 30 and/or the high-precision stereo processor 40, a depth information measurement process can be limited to only a region selected by the image composition unit 50.

Fifth Embodiment

In the first to fourth embodiments, the high-speed stereo processor and high-precision stereo processor independently execute processes. However, a process common to these processors may be simultaneously executed using another means.

Figure 8:
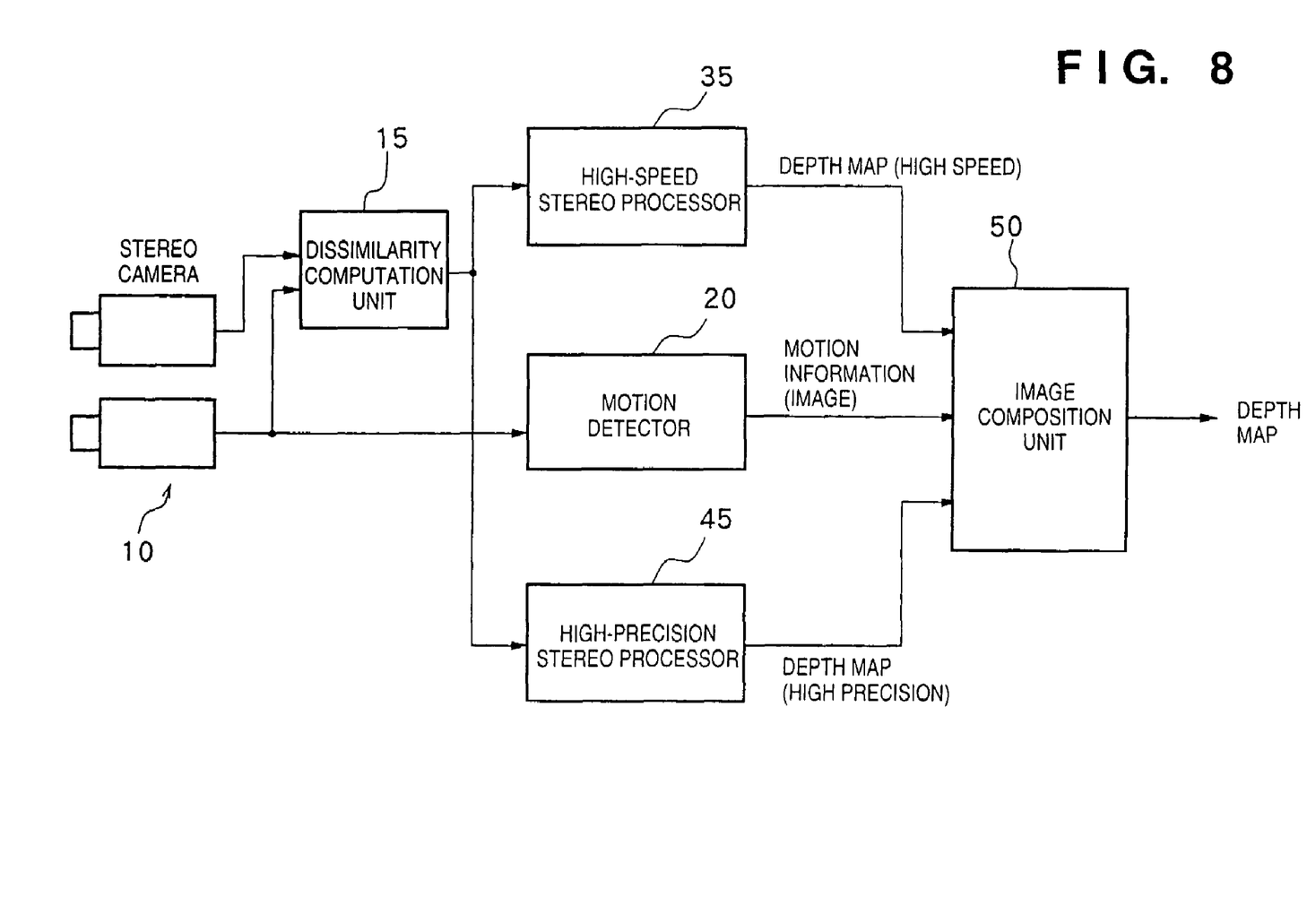
FIG. 8 is a block diagram showing an example of the arrangement of a depth information measurement apparatus according to the fifth embodiment of the present invention.

For example, in the first embodiment, since (1) computation of dissimilarity is the same process in both the high-speed stereo processor 30 and high-precision stereo processor 40, a dissimilarity computation unit 15 for computing the dissimilarity may be added, and its computation result may be transferred to stereo processors 35 and 45, as shown in FIG. 8.

In such arrangement, the stereo processors 35 and 45 can have an arrangement for executing a process ((2) computation of disparity) after the dissimilarity computation in the first embodiment.

Of course, the stereo processors 35 and 45 may have the same arrangement as in the first embodiment, and may execute only (2) disparity computation and subsequent processes. Also, selection in the image composition unit 50 may be controlled in accordance with a condition using a combination of the reliability of depth map data and motion information as in the second and third embodiments.

In the above embodiments, a disparity map as a kind of depth map is generated as depth information. Alternatively, a range image obtained by visualizing distances computed based on the estimated disparity may be generated. Also, only the estimated disparity or distance computed from the estimated disparity may be measured, and visualization may be done using another apparatus.

In the above embodiments, a stereo camera for generating stereo image pairs is described as a building component of the depth information measurement apparatus. However, such stereo camera is not indispensable to the depth information measurement apparatus according to the present invention, and the effect of the present invention can be sufficiently achieved even when depth information is measured using externally supplied stereo image data.

In the above embodiments, as the depth map generation method in the high-speed stereo processor 30 and high-precision stereo processor 40, the method disclosed in K. Satoh and Y. Ohta, "Occlusion detectable stereo using a camera matrix", Proc. 2nd Asian Conf. on Computer Vision, pp. II-331-335, 1995 is used. Alternatively, other methods, for example, a method of sorting evaluation values $e^{k,l}(x, y, d)$ of stereo image pairs and selecting the sum of several pairs in ascending order of evaluation values as a penalty value, as disclosed in K. Satoh and Y. Ohta, "Occlusion Detectable Stereo . . . Systematic Comparison of Detection Algorithms . . . ", Proc. International Conference on Pattern Recognition, pp. 280-286, 1996, may be used.

In the above embodiments, as shown in FIG. 2, the camera matrix including N cameras, which are arranged at equal intervals so that their optical axes are parallel to each other, and a plane that passes through all the lens centers is perpendicular to the optical axes, is used. However, the camera layout need not always maintain this relationship, and an arbitrary number of cameras and an arbitrary camera layout can be used as long as stereo image pairs can be obtained.

In addition, as a depth map generation method of the high-precision stereo processor 40, any other high-precision stereo algorithms that consider factors other than occlusion may be used.

For example, it is difficult for the depth map generation method of the aforementioned high-speed stereo processor 30 to measure accurate depth information of a low-texture region (pattern-less region) on an input image. Therefore, a detector for detecting a low-texture region can be added, and the output from another high-precision stereo processor which can accurately measure even a low-texture region can be selected for the detected region.

As a stereo processing method suitable for such low-texture region, a scheme disclosed in Yuichi Ohta and Takeo Kanade, "Stereo correspondence search using two-step dynamic planning that considers matching between scan lines", Information Processing, No. 26, Vol. 11, pp. 1356-1368, 1985, may be used.

When the image composition unit 50 selects the output from the high-precision stereo processor 40 for a high-texture region or the output from the high-speed stereo processor 30 for a low-texture region in accordance with the spatial density distribution of the reference image, the measurement result (depth information) with higher precision can be obtained.

Three or more different stereo processors may be provided, and the output from an optimal stereo processor may be selected using finer selection conditions.

For example, another high-precision stereo processor suitable for a low-texture region, and a measurement processor of the spatial density distribution of a reference image may be combined to the aforementioned embodiments, so that the output from the normal high-precision stereo processor is used as high-precision depth information for a region having a sufficient change in density, and the output from the other high-precision stereo processor is used as high-precision depth information for a region with a less change in density.

The present invention is not limited to specific stereo algorithms, and may be applied to every combinations of high-precision and high-speed stereo algorithms. Also, the present invention can be applied to a stereo algorithm that directly obtains distance in place of the disparity and outputs a range image.

Furthermore, in the above embodiments, each stereo processor executes a process for one frame. However, a region in an image to be processed by each stereo processor may be limited in advance.

Moreover, the depth information obtained by the depth information measurement apparatus of the present invention can be used in any other applications that require real-time depth measurement such as robot control, automatic drive control for a vehicle, and the like, in addition to the mixed reality presentation apparatus.

As described above, according to the present invention, a high-speed processor capable of measuring depth information at high speed, and a high-precision processor that requires a longer operation time than the high-speed processor but can obtain a result with higher precision are used, and appropriate output results are selectively composited and output in accordance with the state of the captured image, e.g., the magnitude of motion, thus obtaining depth information that can achieve both high precision and high processing speed with good balance.

Furthermore, the present invention can be applied to the system comprising either a plurality of units or a single unit. It is needless to say that the present invention can be applied to the case which can be attained by supplying programs which execute the process defined by the present system or invention.

What is claimed is:

1. A depth information measurement apparatus for measuring depth information at a capture position of a reference image on the basis of the reference image, and at least one peripheral image that forms a stereo image pair with the reference image, comprising:
   a plurality of depth information measurement means for measuring depth information from the reference image and peripheral image, said plurality of depth information measurement means using different measurement methods;
   selection means for selecting one of a plurality of depth information for each predetermined region of the reference image; and
   composition means for compositing the depth information selected by said selection means and outputting the composited information as depth information at the capture position of the reference image.

2. The apparatus according to claim 1, wherein said plurality of depth information measurement means having different measurement precisions and different measuring process speeds from each other, for measuring a plurality of depth information.

3. The apparatus according to claim 1, wherein said plurality of depth information measurement means, comprising:
   first depth information measurement means for measuring first depth information from the reference image and the peripheral image;
   second depth information measurement means for measuring second depth information from the reference image and the peripheral image by a method different from said first depth information measurement means.

4. The apparatus according to claim 3, wherein said first depth information measurement means has a higher processing speed than said second depth information measurement means, and the second depth information has higher precision than the first depth information.

5. The apparatus according to any one of claims 1 to 4, wherein said selection means selects in accordance with a predetermined condition.

6. The apparatus according to claim 5, wherein the predetermined condition is a condition obtained from the reference image and/or the peripheral image.

7. The apparatus according to claim 6, wherein said selection means comprises motion detection means for detecting a motion in each predetermined region from the reference image, and
   said predetermined condition is based on an amount and/or a direction of the motion detected by said motion detection means.

8. The apparatus according to claim 6, wherein one of said plurality of depth information measurement means comprises reliability detection means for detecting a reliability of the measured depth information, and
   said predetermined condition is based on the reliability detected said reliability detection means.

9. The apparatus according to claim 4, wherein said selection means comprises motion detection means for detecting a motion in each predetermined region from the reference image, and
   said selection means selects the first depth information for the predetermined region in which the detected motion has not less than a predetermined amount, and selects the second depth information for other regions.

10. The apparatus according to claim 4, wherein said first depth information measurement means comprises reliability detection means for detecting a reliability of the first depth information, and
    said selection means selects the first depth information for the predetermined region in which the detected reliability has not less than a predetermined amount, and selects the second depth information for other regions.

11. The apparatus according to claim 4, wherein said second depth information measurement means measures the second depth information using a condition which is not considered when said first depth information measurement means measures the first depth information.

12. The apparatus according to claim 11, wherein the conditions include occlusion by an object.

13. The apparatus according to any one of claims 1 to 4, wherein said depth information output from said composition means are one of disparity information, a disparity map, distance information, and a range image.

14. A mixed reality presentation system including a depth information measurement apparatus cited in any one of claims 1 to 4.

15. A storage medium which stores a program that can be executed by a computer apparatus, and makes the computer apparatus that has executed the program function as a depth information measurement apparatus cited in any one of claims 1 to 4.

16. A depth information measurement method for measuring depth information at a capture position of a reference image on the basis of the reference image, and at least one peripheral image that forms a stereo image pair with the reference image, comprising steps of:
    a measurement step of measurement a plurality of depth information from the reference image and peripheral image, using different measurement methods;
    a selection step of selecting one of the plurality of depth information for each predetermined region of the reference image; and
    a composition step of compositing the depth information selected by said selection step and outputting the composited information as depth information at the capture position of the reference image.

17. The method according to claim 16, wherein said measurement step measures the plurality of depth information at different measurement precisions and different measuring process speeds from each other.

18. The method according to claim 16, wherein said measurement step, comprising:
    first depth information measurement step of measuring first depth information from the reference image and the peripheral image;
    second depth information measurement step of measuring second depth information from the reference image and the peripheral image by a method different from said first depth information measurement step.

19. The method according to claim 18, wherein said first depth information measurement step utilizes a higher processing speed than that of said second depth information measurement step, and the second depth information has higher precision than that of the first depth information.

20. The method according to any one of claims 1 to 4, wherein said selection step selects in accordance with a predetermined condition.

21. The method according to claim 20, wherein the predetermined condition is a condition obtained from the reference image and/or the peripheral image.

22. The method according to claim 21, wherein said selection step comprises motion detection step of detecting a motion in each predetermined region from the reference image, and said predetermined condition is based on an amount and/or a direction of the motion detected by said motion detection step.

23. The method according to claim 21, wherein said measurement step has reliability detection step of detecting a reliability of the measured depth information, and said predetermined condition is based on the reliability detected said reliability detection step.

24. The method according to claim 19, wherein said selection step comprises motion detection step of detecting a motion in each predetermined region from the reference image, and said selection step selects the first depth information for the predetermined region in which the detected motion has not less than a predetermined amount, and selects the second depth information for other regions.

25. The method according to claim 19, wherein said first depth information measurement step comprises reliability detection step of detecting a reliability of the first depth information, and said selection step selects the first depth information for the predetermined region in which the detected reliability has not less than a predetermined amount, and selects the second depth information for other regions.

26. The method according to claim 19, wherein said second depth information measurement step measures the second depth information using a condition which is not considered when said first depth information measurement step measures the first depth information.

27. The method according to claim 26, wherein the conditions include occlusion by an object.

28. The method according to any one of claims 1 to 4, wherein said depth information output from said composition step are one of disparity information, a disparity map, distance information, and a range image.

29. A mixed reality presentation system executing a depth information measurement method cited in any one of claims 16 to 19 and 24 to 28.

30. A storage medium which stores a program that can be executed by a computer apparatus, and makes the computer method that has executed the program function as a depth information measurement method cited in any one of claims 16 to 19 and 24 to 28.

* * * * *

UNITED STATES PATENT AND TRADEMARK OFFICE
CERTIFICATE OF CORRECTION

| | |
|---|---|
| PATENT NO. | : 7,295,697 B1 |
| APPLICATION NO. | : 09/648295 |
| DATED | : November 13, 2007 |
| INVENTOR(S) | : Kiyohide Satoh |

It is certified that error appears in the above-identified patent and that said Letters Patent is hereby corrected as shown below:

Col. 1, line 34, "by his or her eyes" should be deleted.

line 59, "hitting determination" should read --a hitting determination--.

line 60, "virtual" should read --a virtual--.

Col. 3, line 52, "surement" should read --suring--.

Col. 12, line 33, "a less" should read --less--.

line 36, "combinations" should read --combination--.

Col. 13, line 20, "having" should read --has--.

line 25, "means," should read --means--.

line 26, "prising:" should read --prises:--.

line 58, "detected" should read --detected by--.

Col. 14, line 18, "are one of" should read --is one of--.

line 33, "measurement" should read --measuring--.

line 48, "step, comprising:" should read --step comprises:--.

UNITED STATES PATENT AND TRADEMARK OFFICE
CERTIFICATE OF CORRECTION

PATENT NO.        : 7,295,697 B1
APPLICATION NO. : 09/648295
DATED             : November 13, 2007
INVENTOR(S)       : Kiyohide Satoh It is certified that error appears in the above-identified patent and that said Letters Patent is hereby corrected as shown below:

Col. 15, line 12, "detected" should read --detected in--.

Col. 16, line 13, "are one of" should read --is one of--.

Signed and Sealed this

Fifteenth Day of July, 2008

JON W. DUDAS
*Director of the United States Patent and Trademark Office*